United States Patent
Stepanenko et al.

(10) Patent No.: US 10,637,137 B2
(45) Date of Patent: Apr. 28, 2020

(54) BROADBAND HELICAL ANTENNA WITH CUTOFF PATTERN

(71) Applicant: Topcon Positioning Systems, Inc., Livermore, CA (US)

(72) Inventors: Anton Pavlovich Stepanenko, Moscow (RU); Andrey Vitalievich Astakhov, Moscow (RU); Dmitry Vitalievich Tatarnikov, Moscow (RU); Ivan Miroslavovich Chernetskiy, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 240 days.

(21) Appl. No.: 15/641,285

(22) Filed: Jul. 4, 2017

(65) Prior Publication Data
US 2017/0301984 A1 Oct. 19, 2017

Related U.S. Application Data

(63) Continuation-in-part of application No. 14/890,610, filed as application No. PCT/RU2015/000234 on Apr. 9, 2015.

(51) Int. Cl.
| | |
|---|---|
| *H01Q 1/36* | (2006.01) |
| *H01Q 1/48* | (2006.01) |
| *H01Q 1/38* | (2006.01) |
| *H01Q 11/08* | (2006.01) |
| *H01Q 9/27* | (2006.01) |

(Continued)

(52) U.S. Cl.
CPC ............ *H01Q 1/48* (2013.01); *G01S 19/22* (2013.01); *H01Q 1/362* (2013.01); *H01Q 1/38* (2013.01); *H01Q 9/27* (2013.01); *H01Q 11/08* (2013.01); *H01Q 21/24* (2013.01)

(58) Field of Classification Search
None
See application file for complete search history.

(56) References Cited

U.S. PATENT DOCUMENTS

| | | | | |
|---|---|---|---|---|
| 3,906,509 A | * | 9/1975 | DuHamel | H01Q 1/362 343/895 |
| 4,161,737 A | * | 7/1979 | Albright | H01Q 19/09 343/749 |

(Continued)

*Primary Examiner* — Trinh V Dinh
(74) *Attorney, Agent, or Firm* — Bardmesser Law Group

(57) ABSTRACT

A broadband quadruple helical circularly-polarized antenna for receiving circularly polarized GNSS signals includes a dielectric cylinder oriented along a vertical axis; four spiral conductors wrapped around the cylinder; the four spiral conductors divided into an upper longitudinal section and a lower longitudinal section; and inductors connecting corresponding spiral conductors of the top and lower longitudinal sections. The spiral conductors in each section have a constant winding angle around the cylinder. The winding angle of all of the conductors in the same longitudinal section is the same. The winding angle of the upper longitudinal section is smaller than the winding angle of the bottom longitudinal. An excitation circuit is connected to the conductors. A third longitudinal section is below the lower longitudinal section, wherein the third longitudinal section includes conductors wound in an opposite direction relative to the lower longitudinal section.

17 Claims, 18 Drawing Sheets

(51) Int. Cl.
*H01Q 21/24* (2006.01)
*G01S 19/22* (2010.01)

(56) References Cited

U.S. PATENT DOCUMENTS

| | | | | | |
|---|---|---|---|---|---|
| 4,169,267 | A | * | 9/1979 | Wong | H01Q 11/083 |
| | | | | | 343/749 |
| 4,229,743 | A | * | 10/1980 | Vo | H01Q 9/30 |
| | | | | | 343/749 |
| 6,246,379 | B1 | * | 6/2001 | Josypenko | H01Q 1/36 |
| | | | | | 343/850 |
| 6,344,834 | B1 | * | 2/2002 | Josypenko | H01Q 1/362 |
| | | | | | 343/895 |
| 6,407,720 | B1 | * | 6/2002 | Josypenko | H01Q 11/08 |
| | | | | | 343/895 |
| 6,653,987 | B1 | * | 11/2003 | Lamensdorf | H01Q 1/38 |
| | | | | | 343/853 |
| 7,173,576 | B2 | * | 2/2007 | O'Neill, Jr. | H01Q 11/08 |
| | | | | | 343/702 |
| 7,245,268 | B2 | * | 7/2007 | O'Neill, Jr. | H01Q 11/08 |
| | | | | | 343/702 |
| 7,525,508 | B2 | * | 4/2009 | Sharaiha | H01Q 1/362 |
| | | | | | 343/700 MS |
| 9,837,709 | B2 | * | 12/2017 | Stepanenko | H01Q 9/12 |
| 2017/0187103 | A1 | * | 6/2017 | Stepanenko | H01Q 9/12 |
| 2018/0090830 | A1 | * | 3/2018 | McMichael | H01Q 1/362 |

\* cited by examiner

| Embodiment | Section# | Winding angle, deg | Length, mm | Diameter, mm |
|---|---|---|---|---|
| FIG. 3A | 311 | 42 | 85 | |
| | 312 | 28 | 15 | |
| | 313 | 59 | 107 | |
| | 314 | 31 | 15 | |
| | 315 | 48 | 92 | |
| | 316 | 73 | 15 | |
| | 317 | 62 | 78 | |
| FIG. 3B | 321 | 26 | 63 | |
| | 322 | 59 | 14 | |
| | 323 | 50 | 150 | |
| | 324 | 54 | 14 | |
| | 325 | 45 | 86 | 24 |
| | 326 | 62 | 14 | |
| | 327 | 61 | 115 | |
| | 328 | 15 | 14 | |
| | 329 | 42 | 64 | |
| FIG. 3C | 331 | 25 | 64 | |
| | 332 | 49 | 15 | |
| | 333 | 54 | 73 | |
| | 334 | 32 | 15 | |
| | 335 | 48 | 80 | |
| | 336 | 31 | 15 | |
| | 337 | 68 | 129 | |
| | 338 | 17 | 15 | |
| | 339 | 49 | 130 | |
| | 340 | 19 | 15 | |
| | 341 | 21 | 50 | |

FIG. 4

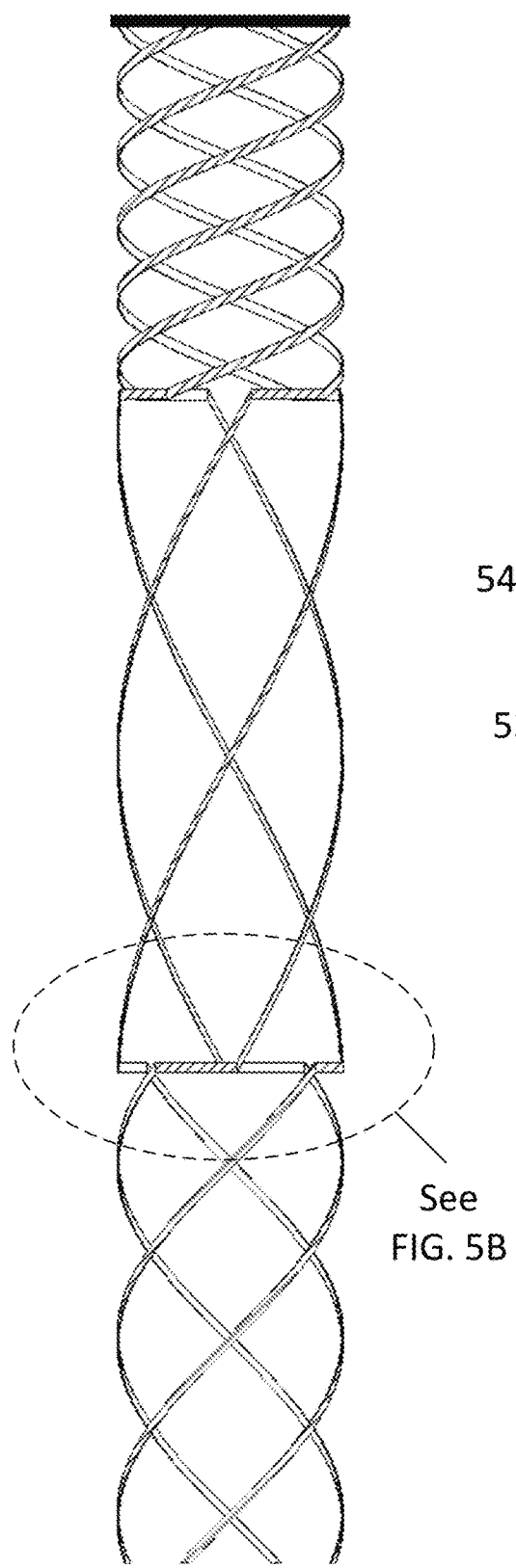
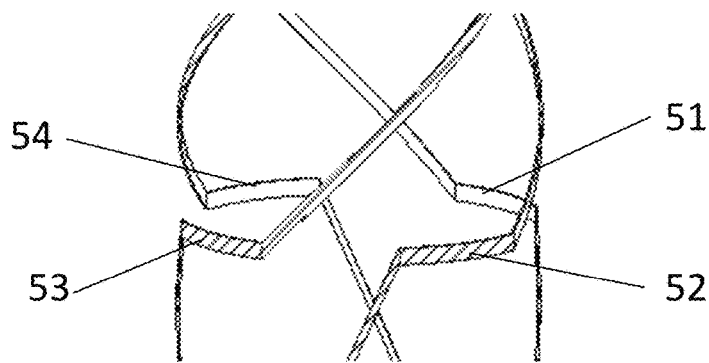
FIG. 5B
FIG. 5A

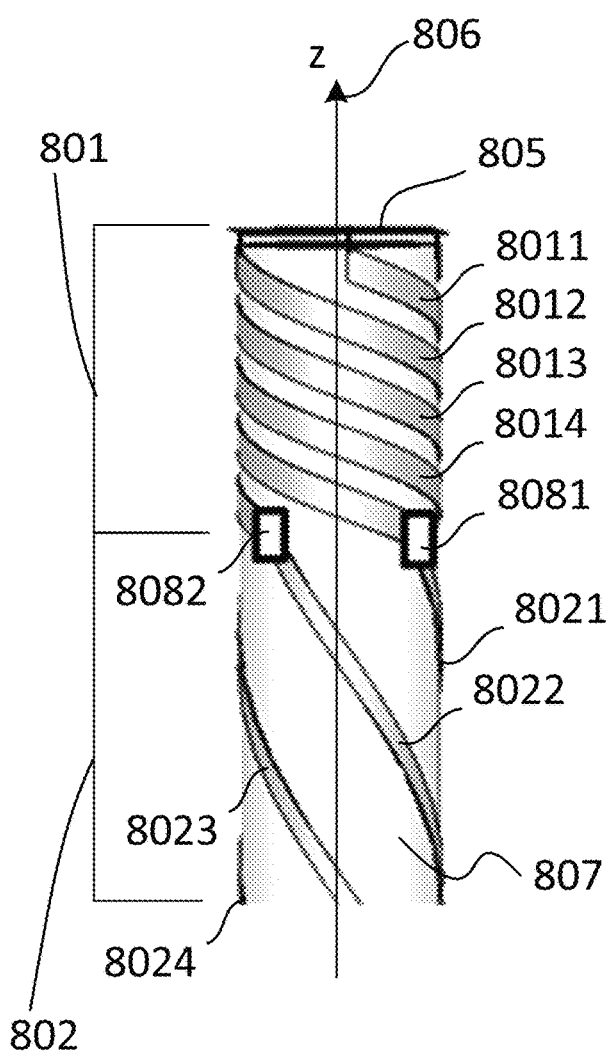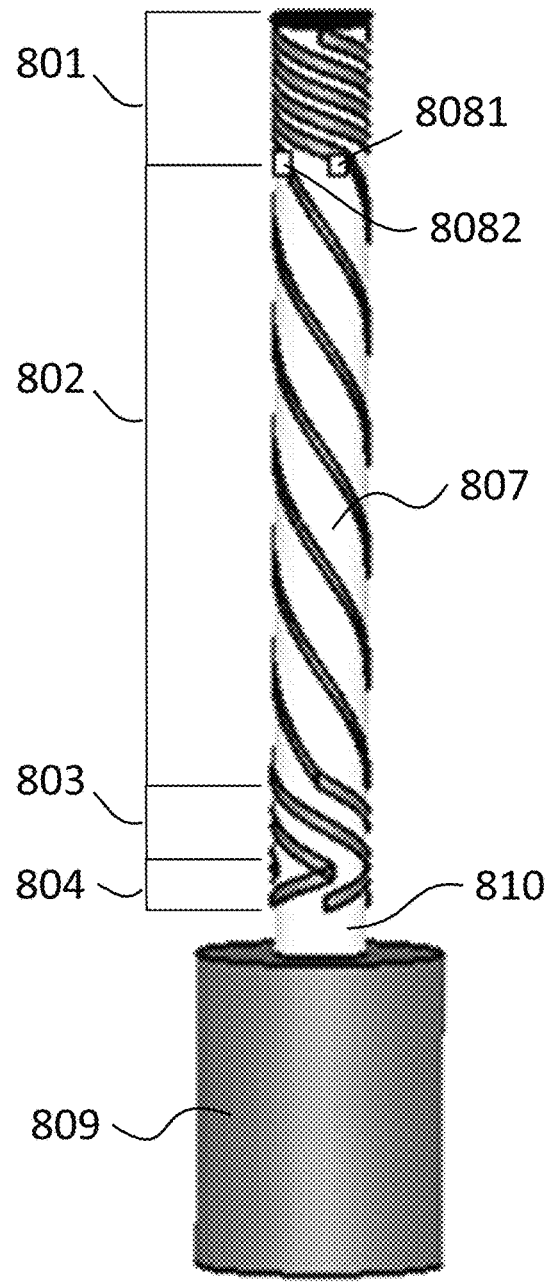
FIG. 8A
FIG. 8B

BROADBAND HELICAL ANTENNA WITH CUTOFF PATTERN

CROSS REFERENCE TO RELATED APPLICATIONS

This application is a continuation in part of U.S. patent application Ser. No. 14/890,610, filed on Nov. 12, 2015, which is a US National Phase of PCT/RU2015/000234, filed on Apr. 9, 2015, which are both incorporated by reference herein in their entirety.

BACKGROUND OF THE INVENTION

Global navigation satellite systems (GNSS) are widely used for high-precision positioning, such as the US Global Positioning System (GPS) and Russian global navigation system GLONASS, as well as some others. A GNSS antenna has to provide signal reception in the whole GNSS range, namely, a low-frequency band 1164-1300 MHz and high-frequency band 1525-1610 MHz.

One of the most important positioning errors in GNSS systems is a so-called multipath error, when a signal reflected from the underlying ground surface appears at the input of the receiving antenna along with the line-of-sight signal.

The value of the multipath error is proportional to the ratio $$DU(\theta) = \frac{F-(\theta)}{F(\theta)}$$

This ratio is normally called the Down/Up ratio. In this ratio, $\theta$ is the elevation angle over the horizon, and $F(+/-\theta)$ is the antenna pattern (AP) at angle $\theta$ above and under the local horizon ($\theta=0°$) correspondingly. A spatial region where $\theta>0$ is the upper or front hemisphere, otherwise, a spatial region at $\theta<0$ is called the lower or backward hemisphere.

To provide a stable and reliable operation of positioning systems, quality signal reception from all satellites over the local horizon is required. The value $F(\theta)$ in the upper hemisphere is not to highly vary. At the same time, the value $F(\theta)$ in the lower hemisphere should be as small as possible. So the value $F(\theta)$ should have a sharp drop in the vicinity of the local horizon (i.e., near $\theta=0°$).

Receiving antennas thus need to provide such an AP whose level is negligibly varied in the upper hemisphere, sharply drops in crossing the direction to the local horizon, and is small in the lower hemisphere. Also, such an antenna pattern needs to be provided over whole operational frequency range.

SUMMARY OF THE INVENTION

The objective of the invention is an antenna with an antenna pattern whose level varies slightly in the upper hemisphere, drops in the direction of the local horizon, and is small in the lower hemisphere, over the entire desired frequency range.

To implement this objective, a circularly-polarized antenna is utilized in the backfire operation mode. The antenna includes a hollow dielectric cylinder (used as mechanical support for the conductors) oriented along a vertical axis; four spiral conducting elements wrapped around the cylinder; the four spiral conducting elements are divided into a plurality of longitudinal sections. The conducting elements in each section have a constant winding angle (pitch angle, i.e., angle relative to a plane normal to antenna axis) around the cylinder. The winding angle of all of the conducting elements in the same longitudinal section is the same. Neighboring longitudinal sections have different winding angles relative to each other. An excitation circuit is connected to the conducting elements.

In another embodiment, an antenna for receiving circularly polarized signals includes a (hollow) dielectric cylinder oriented along a vertical axis; four spiral conducting elements wrapped around the cylinder; the four spiral conducting elements divided into the first (upper) longitudinal section and a second (lower) longitudinal section located below the first section; inductors connecting corresponding spiral elements of the first and second longitudinal sections. The conducting elements in each section have a constant winding angle around the cylinder. The winding angle of all of the conducting elements in the same longitudinal section is the same. The winding angle of the first longitudinal section is lower than the winding of the second longitudinal section. An excitation circuit is connected to the conducting elements.

Optionally, more sections can be located below the second longitudinal section.

Optionally, a third (bottom, or last) longitudinal section includes conducting elements wound in an opposite direction relative to the above located longitudinal sections. Optionally, impedance elements are connecting the lower longitudinal section to a base of the antenna. Optionally, the impedance elements are resistive, or resistive and series- or parallel-inductive.

Optionally, the winding angle of the first (topmost) longitudinal section is 10°-30°. Optionally, the winding angle of the second longitudinal section is 35°-70°. Optionally, a first set of additional parasitic conductive elements in a first plane perpendicular to the vertical axis and rotationally symmetric around the vertical axis, wherein the first plane is located approximately where the inductors are located. Optionally, the additional parasitic conductive elements are straight. Optionally, the additional parasitic conductive elements are bent. Optionally, there is a second set of additional parasitic conductive elements in a second plane perpendicular to the vertical axis and rotationally symmetric around the vertical axis, wherein the second plane is above the upper longitudinal section.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

Figure 3A:
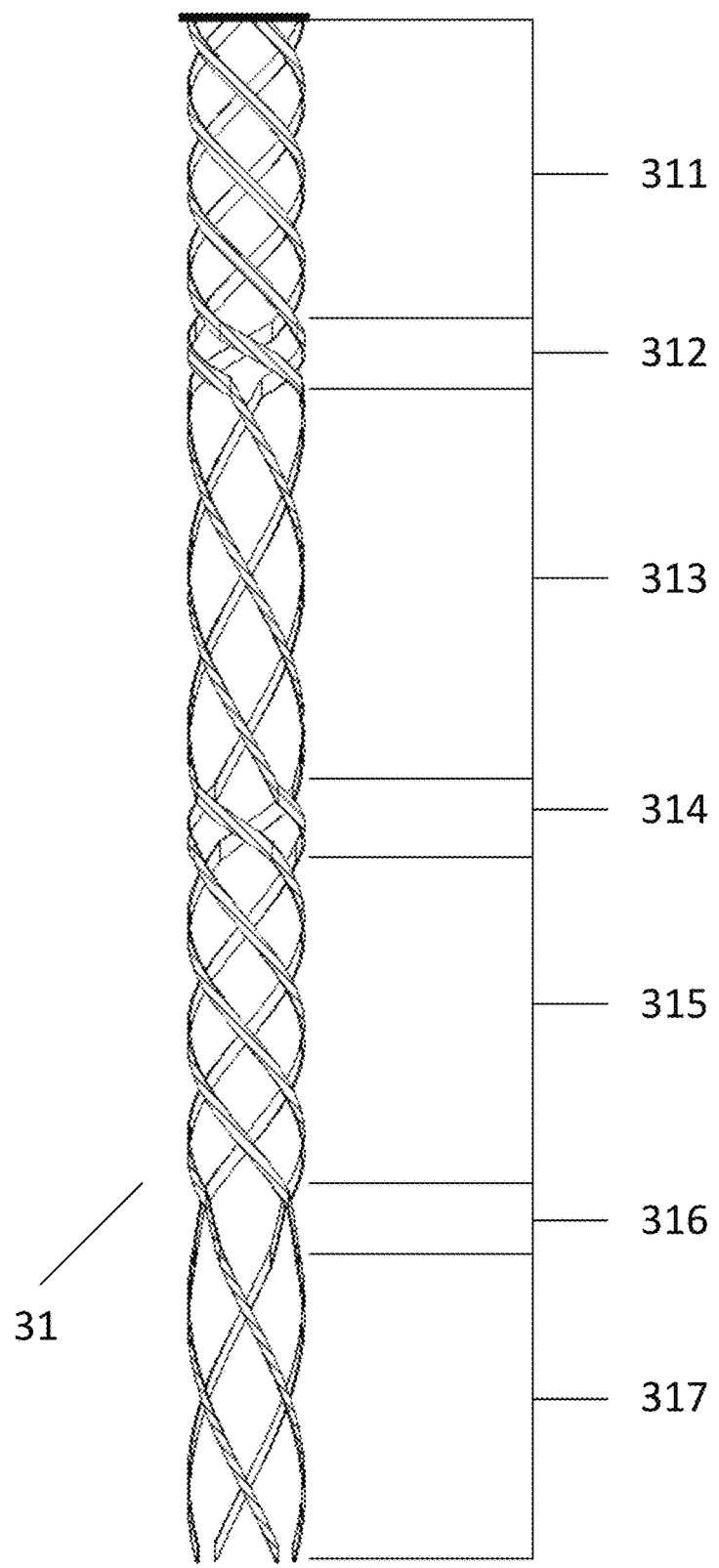
Figure 3B:
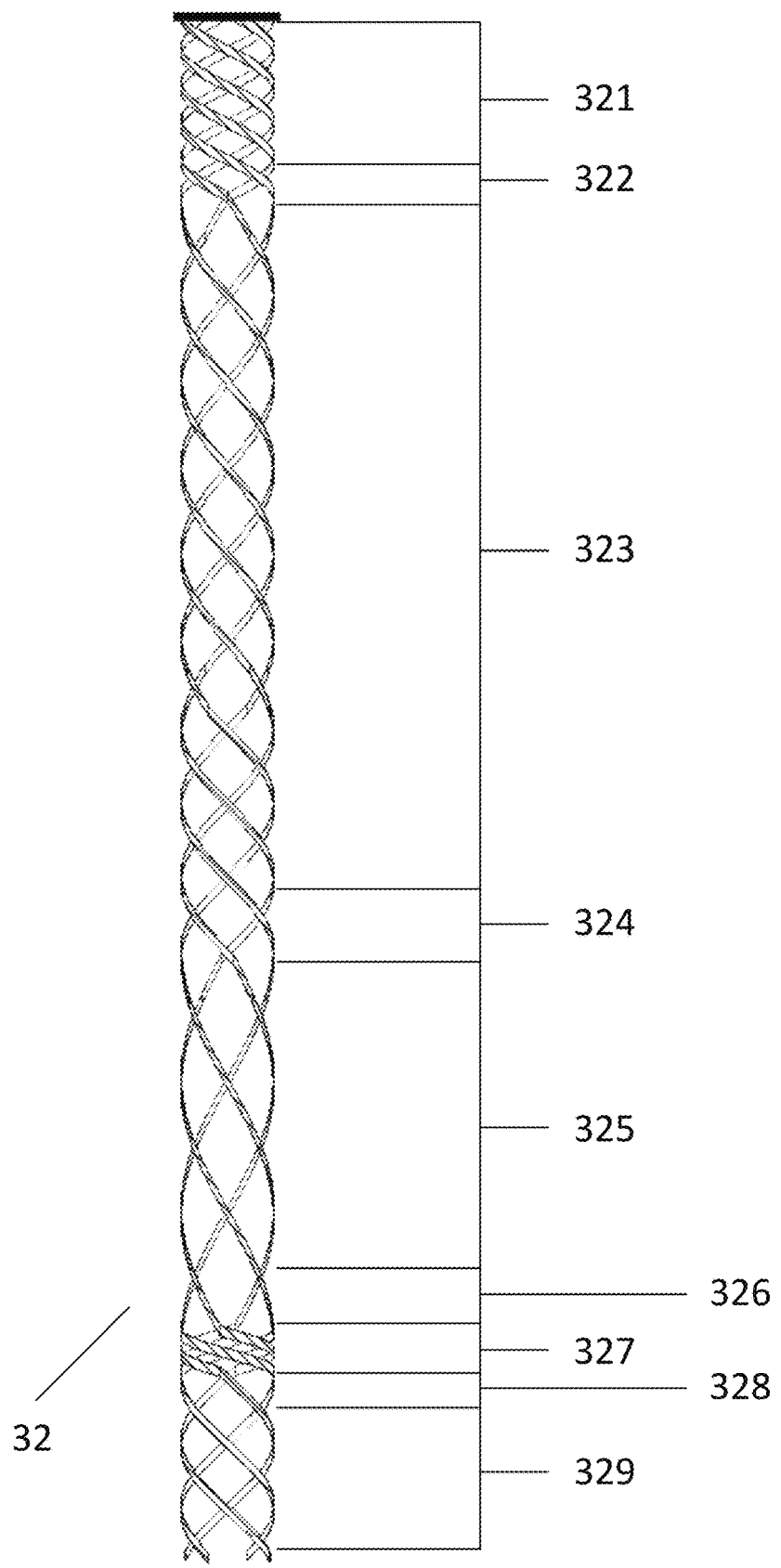
Figure 3C:
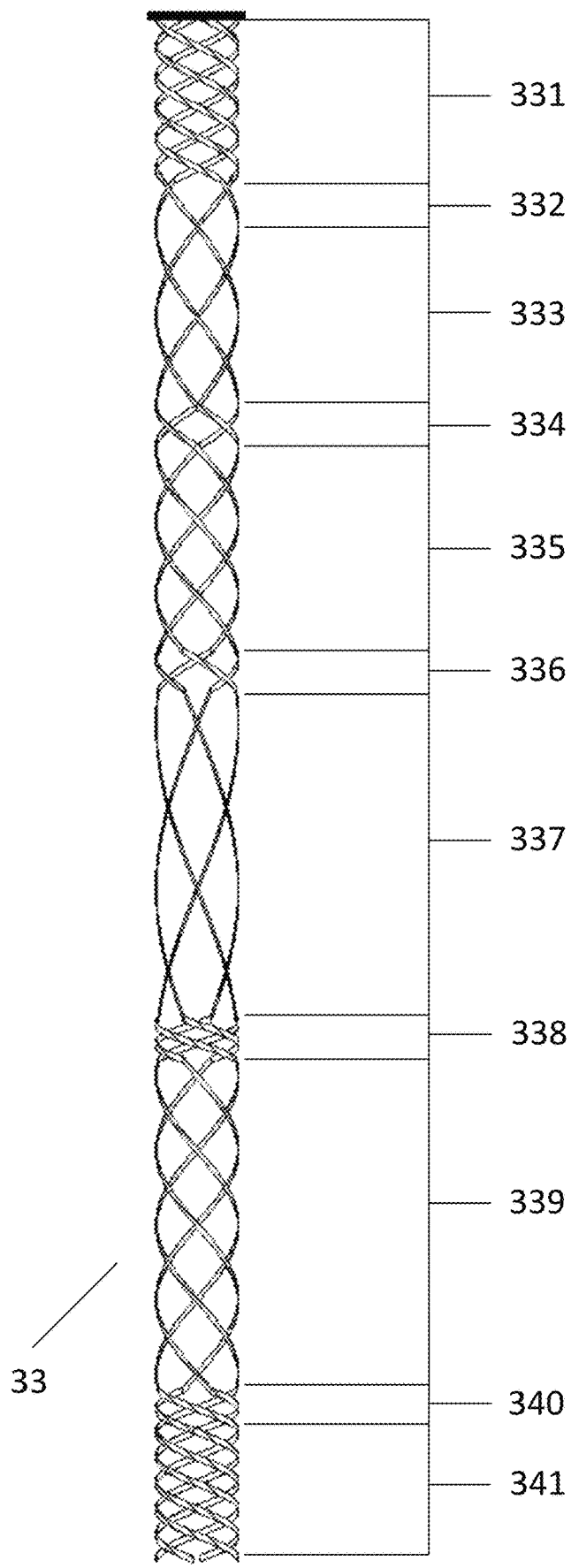
Figure 6A:
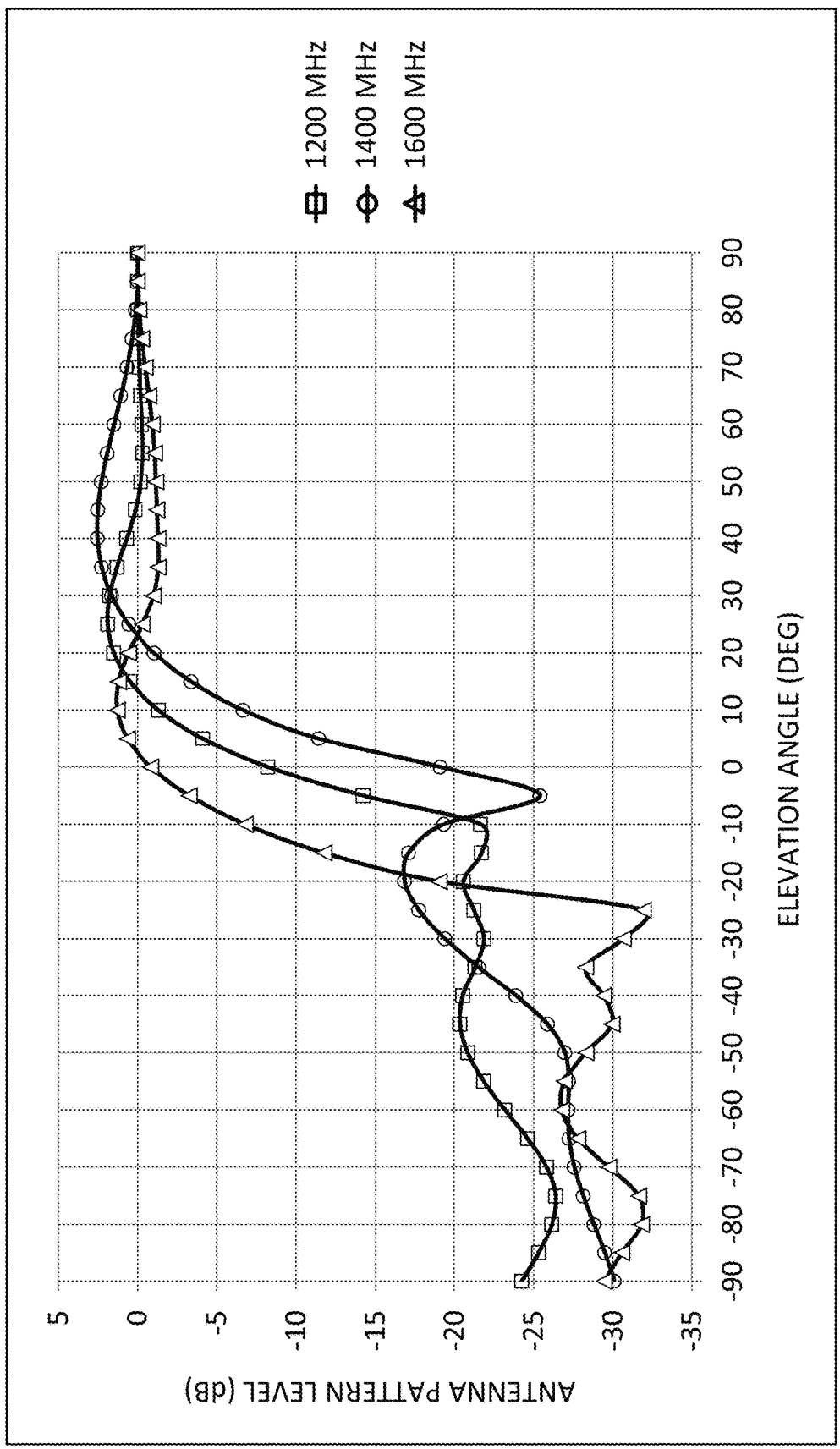
Figure 6B:
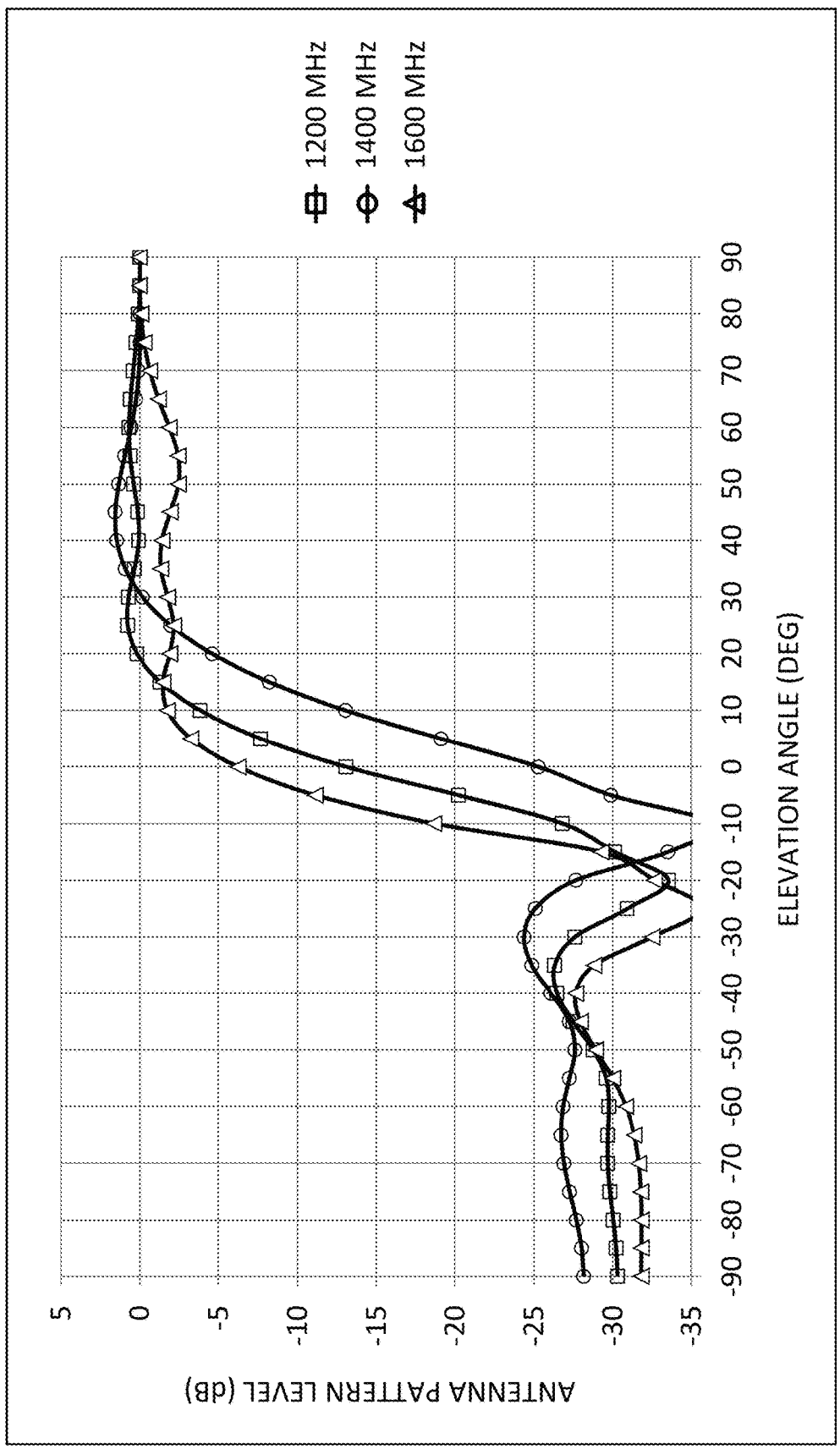
Figure 6C:
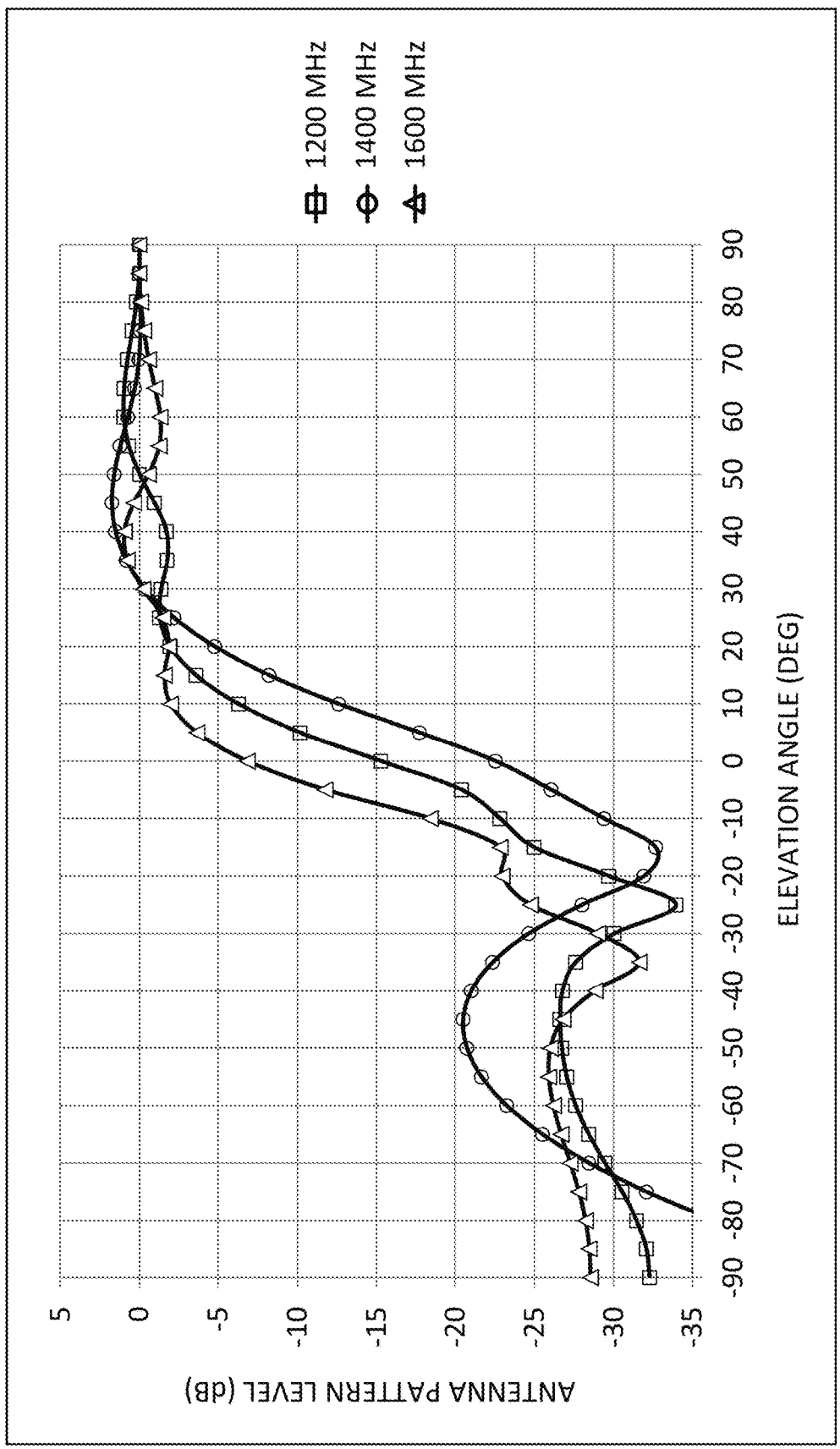
Figure 7:
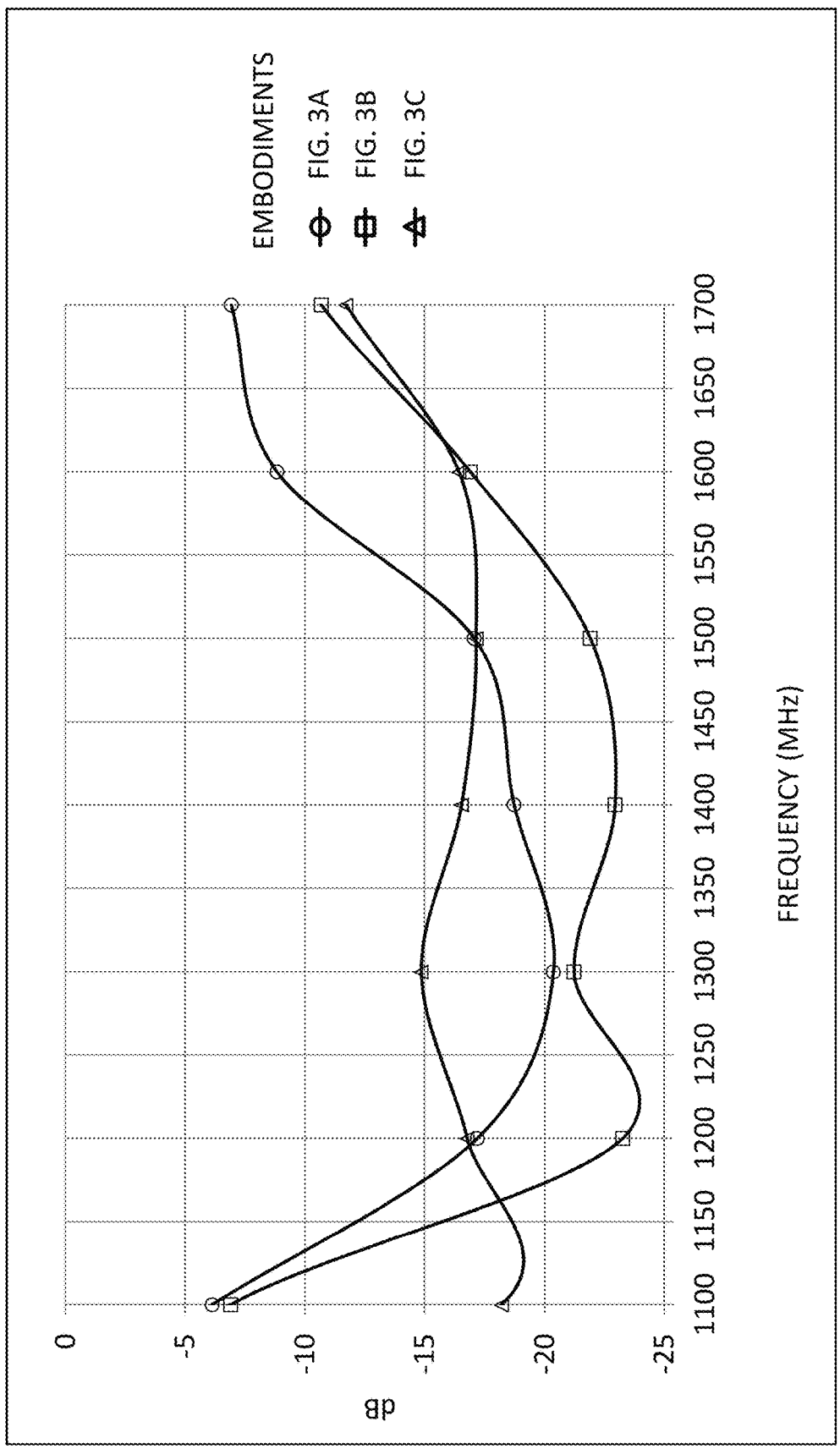

FIGS. 3A, 3B, 3C present embodiments of the design of a quadruple cylindrical spiral antenna;

FIG. 4 shows parameters for design embodiments of a quadruple cylindrical spiral antenna shown in FIG. 3A, 3B, 3C;

FIGS. 5A, 5B show one of embodiments for a quadruple cylindrical spiral antenna;

FIG. 6A depicts graphs of the antenna pattern for the design shown in FIG. 3A;

FIG. 6B presents graphs of the antenna pattern for the design shown in FIG. 3B;

FIG. 6C shows graphs of the antenna pattern for the design shown in FIG. 3C; and FIG. 7 shows graphs of the DU ratio for elevation $\theta=10°$ for embodiments shown in FIG. 3A, 3B, 3C.

FIGS. 8A, 8B show additional design embodiments for the proposed antenna with inductances.

Figure 9:
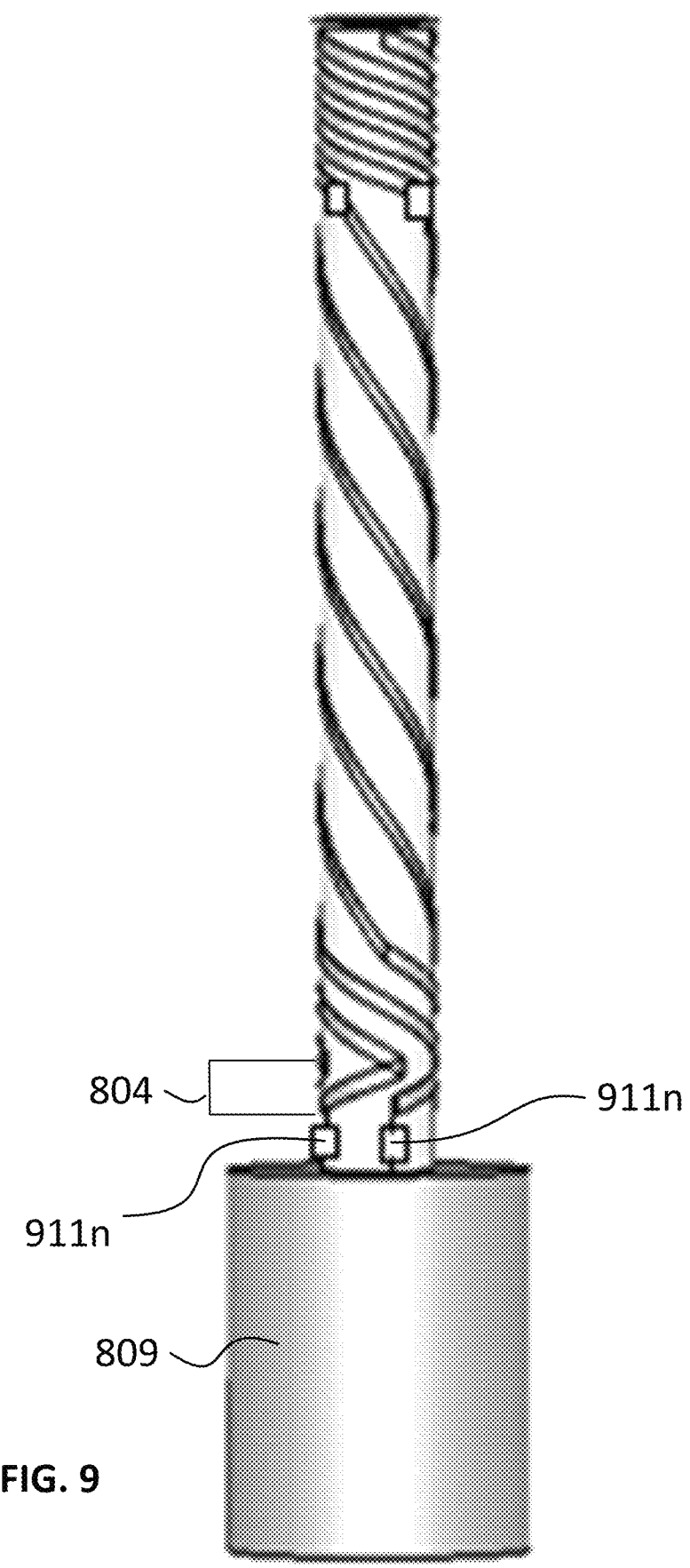
Figure 10B:
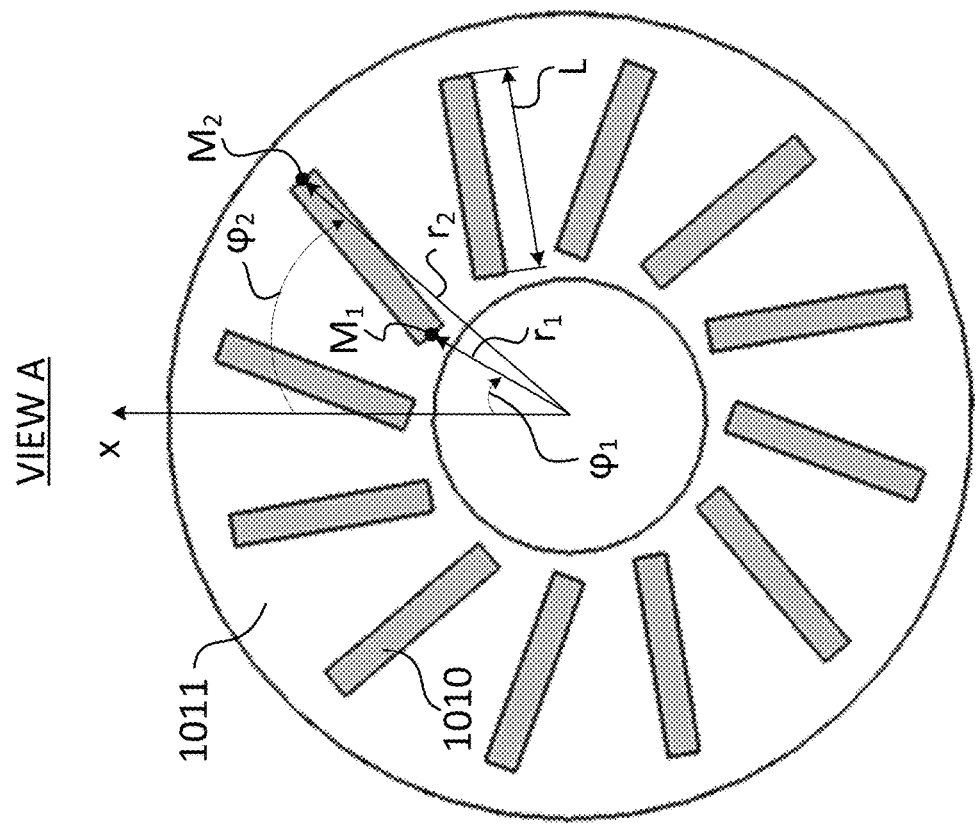
Figure 10A:
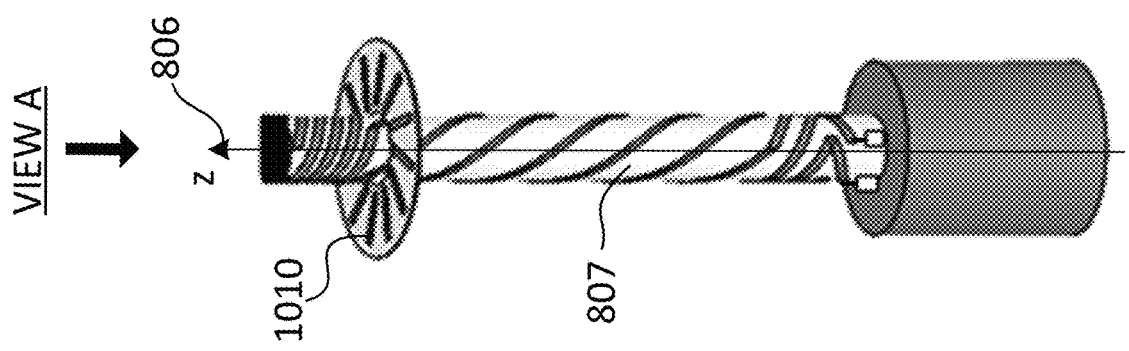
Figure 10C:
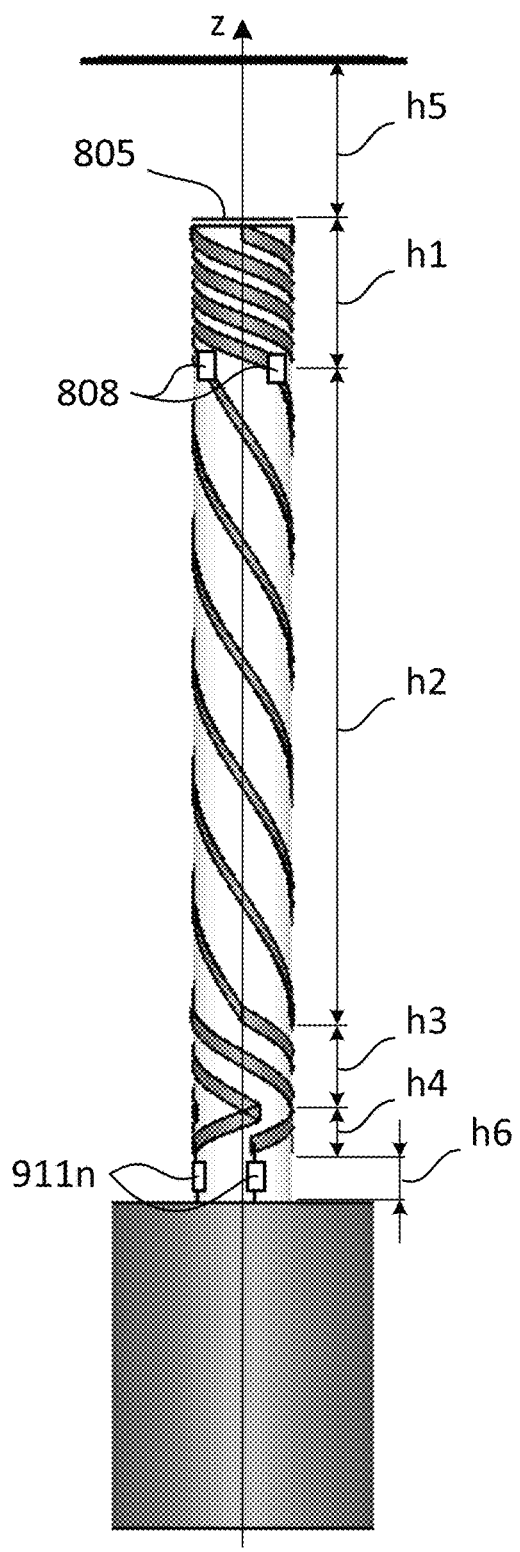
Figure 10D:
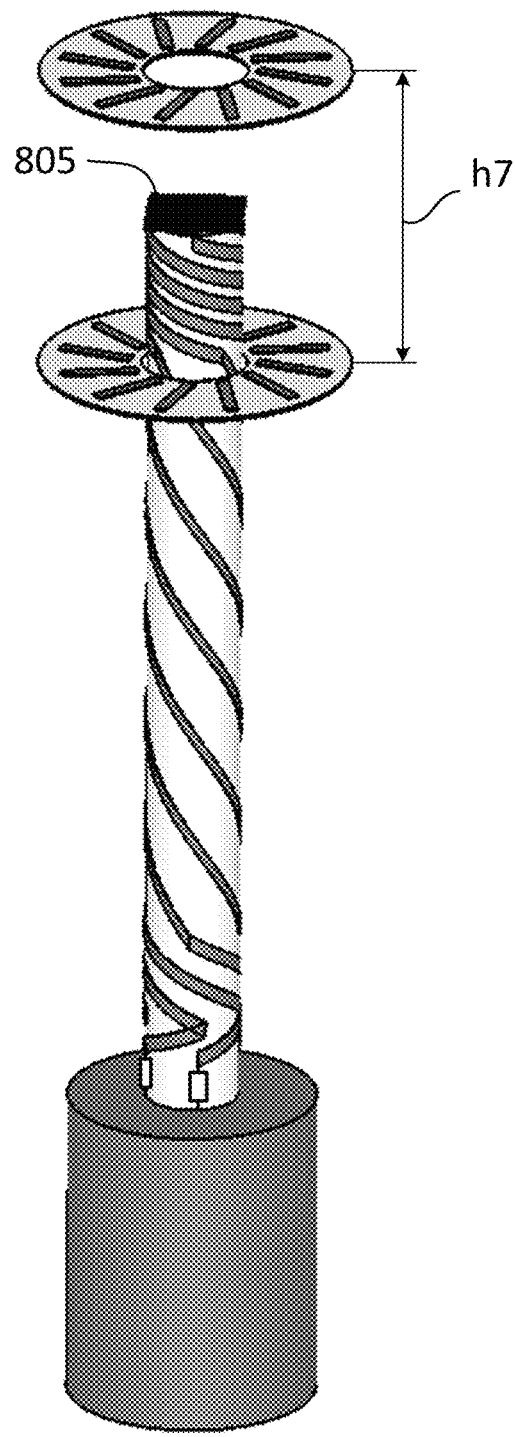
Figure 11A:
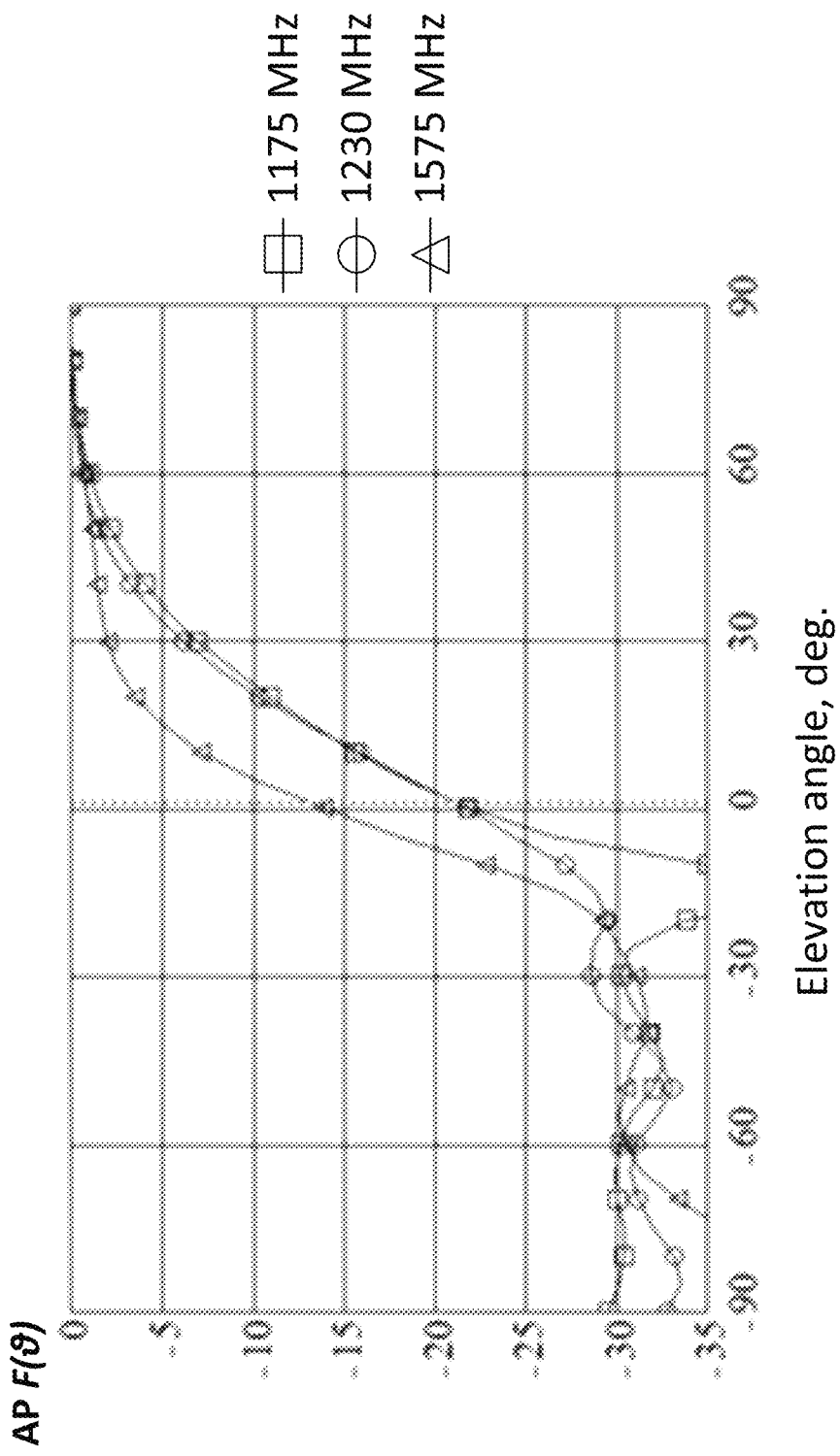
Figure 11B:
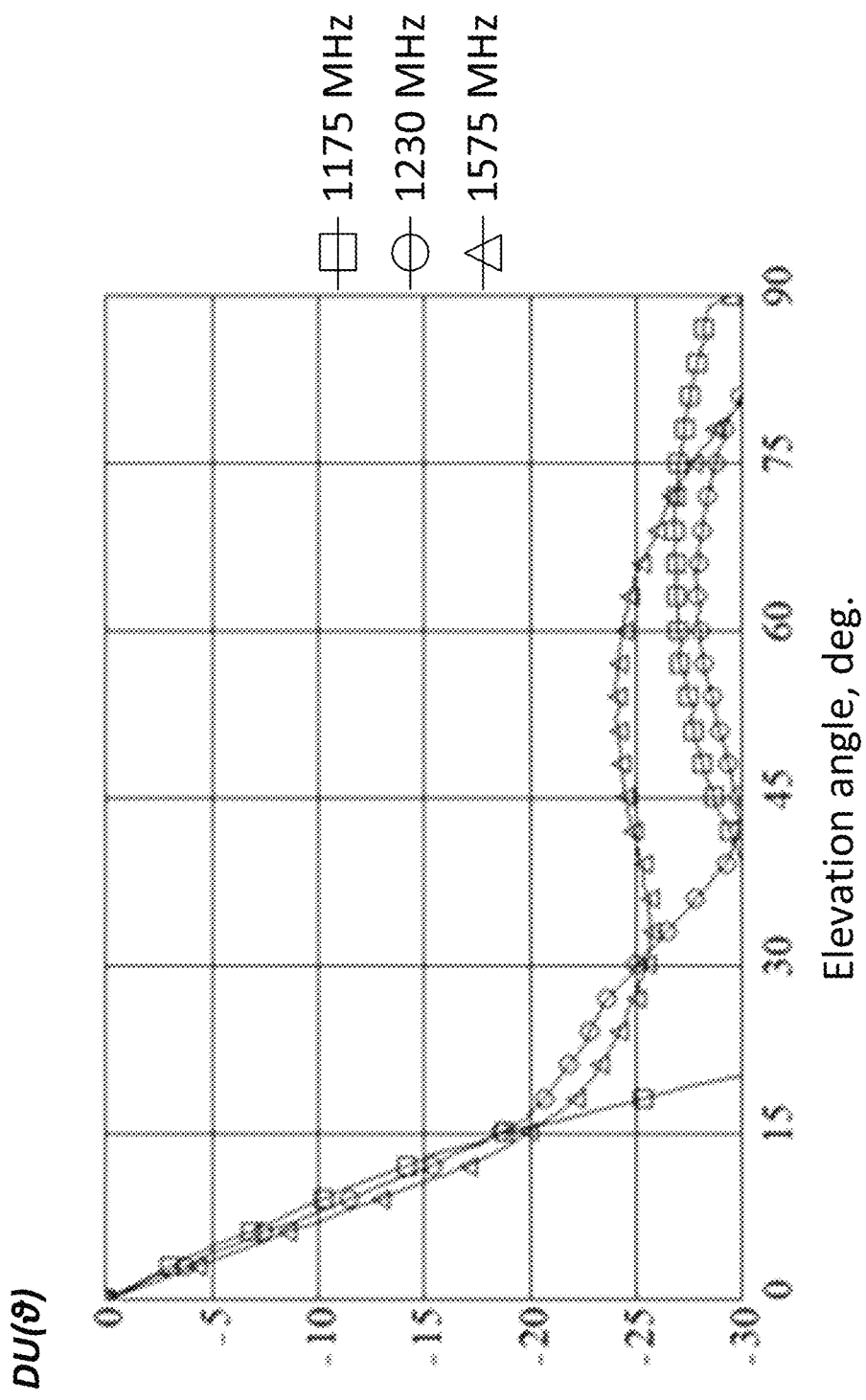

FIG. 9 shows an embodiment of a design with impedance elements connected to a metal base FIGS. 10A, 10B, 10C, 10D show an embodiment of a design with parasitic elements FIGS. 11A, 11B show antenna pattern graphs (AP) $F(\theta)$ and $DU(\theta)$ ratios for different frequencies.

DETAILED DESCRIPTION OF THE PREFERRED EMBODIMENTS

Reference will now be made in detail to the preferred embodiments of the present invention, examples of which are illustrated in the accompanying drawings.

Figure 1:
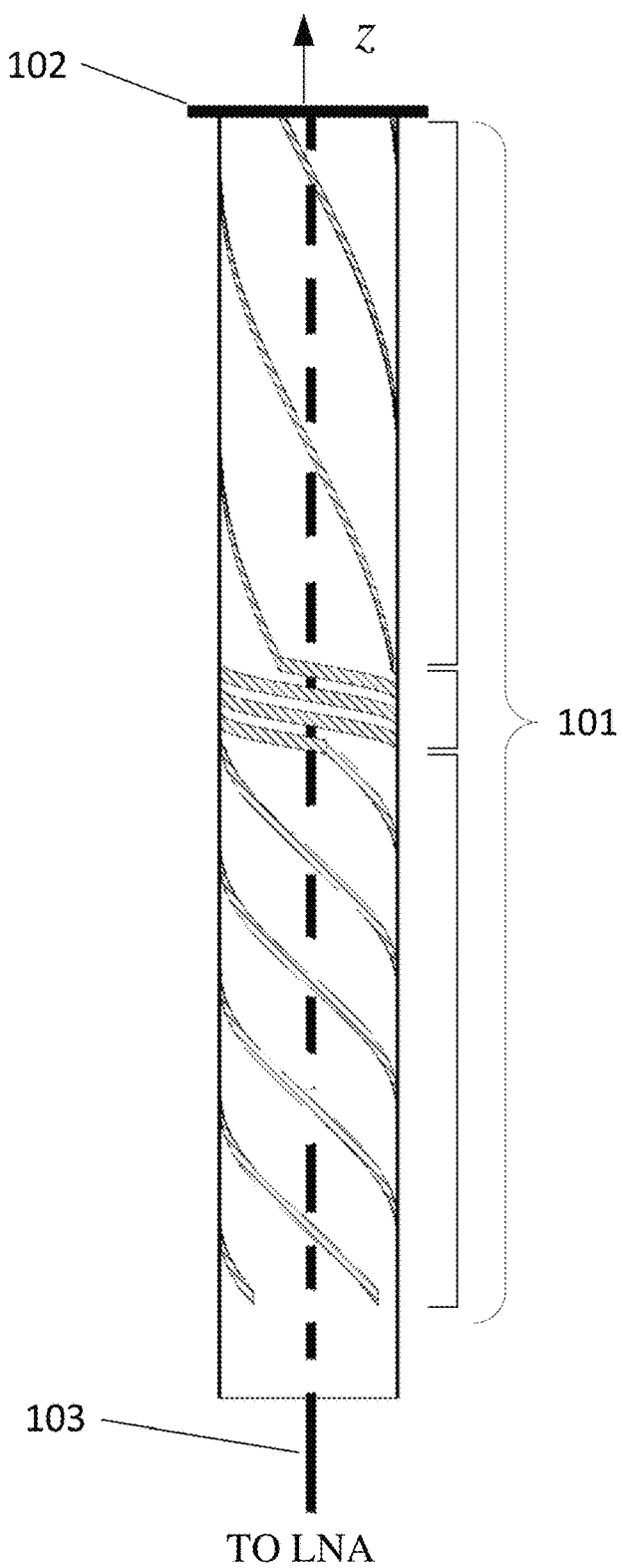
FIG. 1 shows an appearance of a quadruple cylindrical spiral antenna.

A wideband circularly-polarized antenna is proposed to receive GNSS signals. According to FIG. 1, the antenna comprises a set of quadruple spiral elements 101, an excitation circuit 102, and a power cable 103. The antenna design is elongated along the vertical axis (z). Positive direction of axis z corresponds to $\theta=90°$.

The excitation circuit 102 is located above, and, thereby, the backfire operation mode is implemented. The power cable 103 is in the center of the antenna. The upper end of the power cable 103 is connected to the excitation circuit 102. The lower end of the power cable 103 is connected to the input of a low-noise amplifier (the LNA is not shown).

The excitation circuit is well-known and is an equal-amplitude power splitter with one input and four outputs. The phase difference between neighboring outputs is 90 degrees. Each output of the excitation circuit is connected to a corresponding conductor of the first (upper) quadruple spiral element, thereby providing excitation of a right hand circular polarization (RHCP) wave in the positive direction of the vertical antenna axis z. The antenna pattern has maximum in this direction.

Each of quadruple spiral elements consists of four conductors wound at the same angle and forming a quadruple spiral whose axis is aligned with the z axis. Each conductor is one spiral turn of the quadruple spiral. The winding angle for the conductors is the same for the entire quadruple spiral element.

Figure 2A:
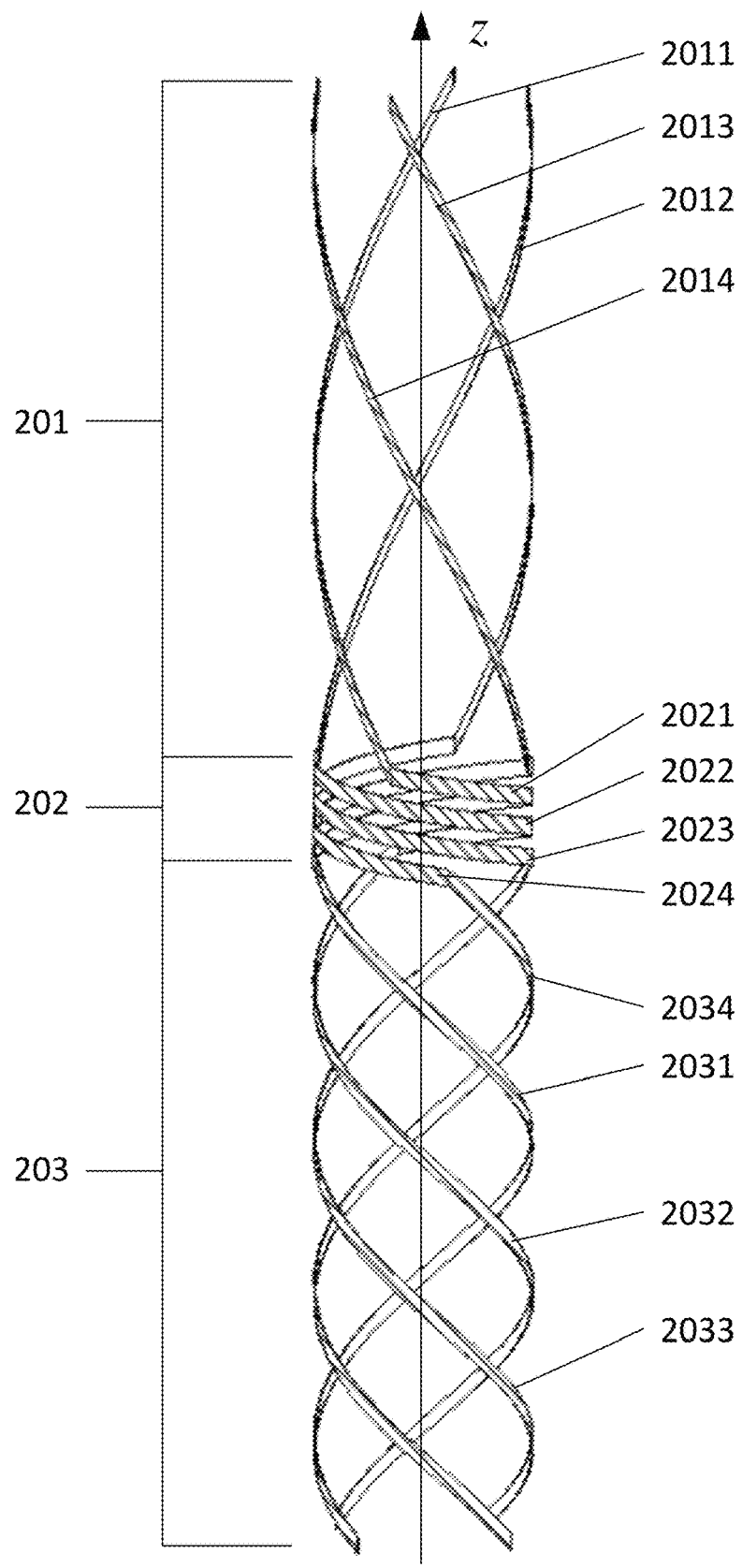
FIGS. 2A, 2B show quadruple cylindrical spiral elements.

FIG. 2A shows quadruple spiral elements (sections) 201, 202, 203, 204 and corresponding forming conductors (spiral conductors): 2011, 2012, 2013, 2014; 2021, 2022, 2023, 2024, 2031, 2032, 2033, 2034. The conductors are applied to a dielectric substrate (not shown) that is further bent to form a hollow cylinder.

Figure 2B:
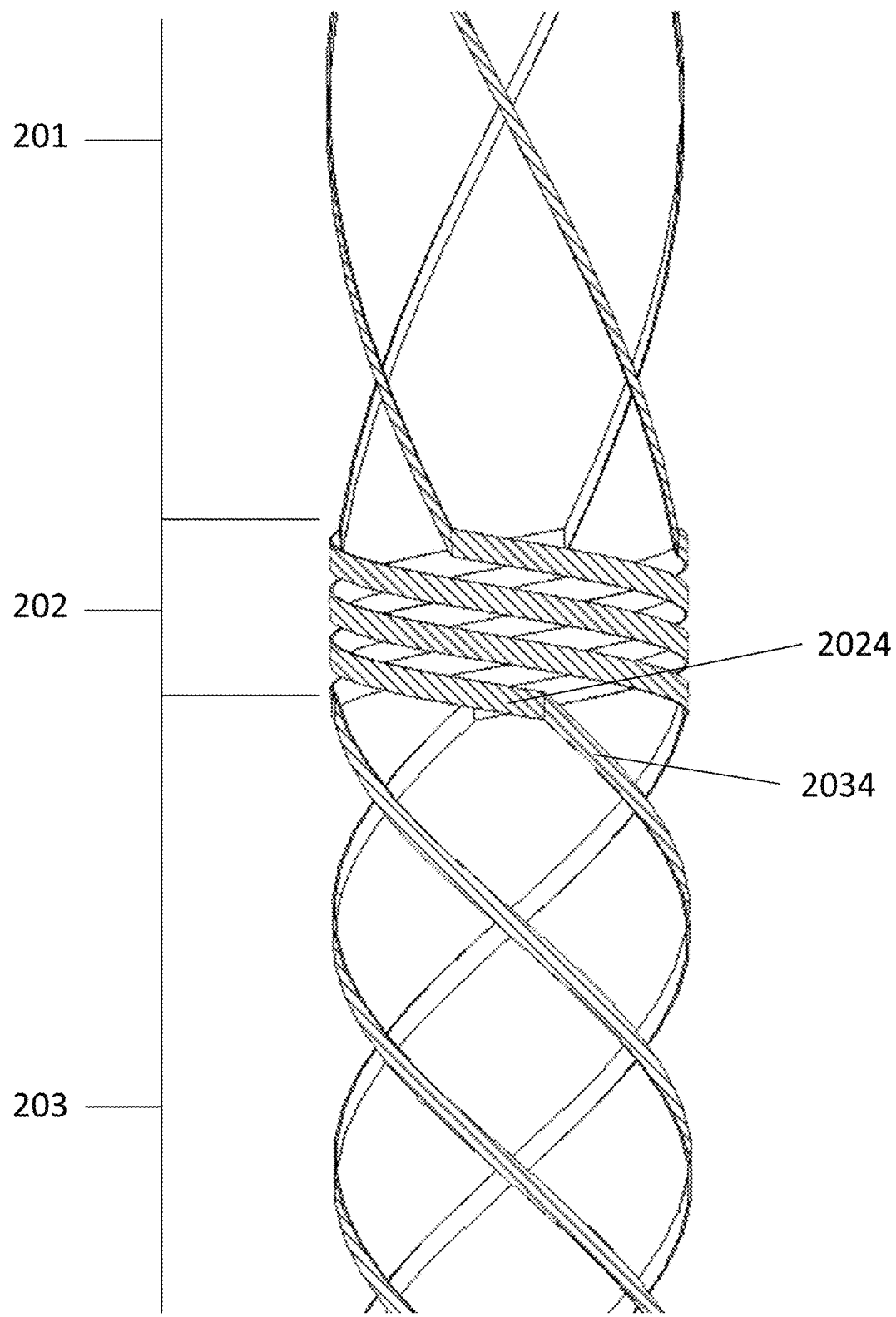

Each conductor has a first (top) and second (bottom) ends. From FIG. 2B, the first and second conductor ends (for example, 2024 and 2034) of neighboring spiral elements (for example, 202 and 203) geometrically match.

The exception of this rule is conductors of the first (top) and the last (bottom) elements. First (top) conductor ends of the first quadruple spiral element are connected to the excitation circuit, and second (bottom) conductor ends of the last quadruple spiral element are open.

Thus, the antenna includes a set of two or more quadruple spiral elements. A feature of the design is the same winding angle for the conductors of the same spiral elements, while the conductors of the neighboring spiral elements have different winding angles.

FIGS. 3A, 3B, 3C show possible embodiments of the spiral antenna. FIG. 3A presents a design of the spiral antenna with seven spiral elements, FIG. 3B shows a design with nine spiral elements, and the embodiment of FIG. 3C includes eleven spiral elements. In Table of FIG. 4 there are parameters of the embodiments shown. Note that although the described embodiments use 4 spiral conductors, more (e.g., 6 or 8) or fewer (e.g., 3) can also be used.

First and second conductor ends of the neighboring spiral elements can mismatch.

FIG. 5A, 5B show an embodiment with mismatching first and second conductor ends of the neighboring elements. In this case, the conductors of the neighboring spiral elements are connected to each other by conductors 51, 52, 53, 54 which are circle segments.

FIG. 6A, FIG. 6B, and FIG. 6C show graphs of antenna patterns normalized to the zenith $(\theta=) 90°$ for different design embodiments. Parameters of these embodiments are given in FIG. 4. It can be seen that the antenna provides an AP with a nearly stable level in the upper hemisphere, a drop in the level close to the horizon, and a small level in the lower hemisphere.

FIG. 7 presents frequency graphs for DU ratio at $\theta=10°$, that is $$DU(\theta) = \frac{F(-10°)}{F(10°)}$$

for different embodiments. Embodiments 2 and 3 are seen to provide a $DU(\theta=10°)$ ratio at least −15 dB in the whole frequency range from 1164-1610 MHz. Embodiment 1 produces the worst ratio $DU(\theta=10°)$ in the high-frequency part of the range, but the actual antenna has the smallest dimensions, of the three embodiments discussed herein.

FIGS. 8A, 8B illustrate another embodiment of the proposed antenna. FIG. 8A shows a top part of the design in more detail.

An antenna for receiving circularly polarized signals includes a hollow dielectric cylinder 807 (used as mechanical support for the conductors) oriented along a vertical axis 806; four spiral conducting elements wrapped around the cylinder 807; the four spiral conducting elements are divided into at least two of longitudinal sections 801, 802. In FIGS. 8A, 8B, the conducting elements of section 801 are designated as 8011, 8012, 8013 and 8014. The conducting elements of section 802 are designated as 8021, 8022, 8023 and 8024. The winding angle of all of the conducting elements in the same longitudinal section is the same.

The conducting elements in each section have a constant winding angle. Neighboring longitudinal sections have different winding angles. Each of four conducting elements at the junction of first section 801 and second section 802 has a break to which lumped inductors 8081, 8082, 8083 and 8084 are connected. FIGS. 8A, 8B show inductors 8081 and 8082, and inductors 8083 and 8084 are hidden by hollow dielectric cylinder 807. So each conducting element 801$n$ of first (top) section 801 is connected to excitation circuit 805 via one end, and the other end is connected to inductor 808$n$. Hereafter n=1, 2, 3, 4. Each inductance 808$n$, in turn, has the other end connected to corresponding conducting element 802$n$ of second (bottom) section 802. The winding angle of the conducting element of the first section $\gamma_1$ is smaller than the winding angle of the conducting element of the second section $\gamma_2$: $\gamma_1 < \gamma_2$. Winding angle $\gamma_1$ can be in a range of 10°-30°, and winding angle $\gamma_2$ can be from 35° up to 70°. The diameter of hollow dielectric cylinder 807 lies within 0.05$\lambda$-0.23$\lambda$, where $\lambda$ is the wavelength of the smallest frequency of the operating range.

The presence of the lumped inductors 808$n$ provides such amplitude-phase ratio of currents in spiral conductors of the first and second sections that DU($\theta$) becomes better at a smaller overall vertical antenna size.

The number of longitudinal sections may be greater than two. FIG. 8B shows the case when there are additional sections 803 and 804. In this case, conducting elements of second section 802 are connected to the corresponding conducting elements of third section 803.

Spiral conducting elements can be manufactured on a flexible PCB bent as a cylinder. Then, the hollow dielectric cylinder 807 is made in the form of a bent substrate of PCB-board. At the top end of the cylinder there is excitation circuit 805, at the bottom end of the cylinder there are no conducting elements and this end is fixed to metal base/support 809 (FIG. 8B). There is thus gap 810 between the metal base and conducting elements. The metal base can be shaped as a cylinder.

Spiral conducting elements of each section are left-handed helixes. As a variant, the conducting elements of the lower section 804 can have a reverse direction of winding and then be shaped as right-handed helix. The latter case is shown in FIG. 8B. If such conducting elements with back winding are available, then ratio DU($\theta$) decreases in the low-frequency band.

FIG. 9 shows another embodiment of an antenna design. Each conducting element of lower section 804 is connected to impedance element 911$n$ which, in turn, is connected to base 809. The impedance element can be either a resistor or a serial or parallel combination of a resistor and an inductor. The resistance is typically 200 Ohm to 2000 Ohm; the inductance is typically 5 nH to 30 nH. This allows decreasing the reflected current wave and improving the ratio DU($\theta$).

FIG. 10A shows an additional antenna design. The antenna contains a set of additional parasitic elements 1010 located around hollow dielectric cylinder 807 with spiral conducting elements. Parasitic elements 1010 are a set of conductors in the plane perpendicular to the symmetry axis of antenna z 806. The set of conductors has rotation symmetry relative to axis z 806. Parasitic elements 1010 improve ratio DU($\theta$) near angle $\theta$=90° (which corresponds to decreasing of AP level in the nadir direction). The conductors of parasitic elements can be made as a metallization layer on PCB board 1011. PCB board 1011 has such a central hole that cylinder 807 could pass through it. The conductors can be shaped straight or bent. FIG. 10B shows a Printed Circuit Board (PCB) 1011 with conductors 1010. Each conductor 1010 has a starting point M1 and end point M2. The coordinates of these points are set in the polar coordinate system as r and $\varphi$. The center of the polar system lies in the center of the PCB. Angle $\varphi$ is clockwise starting from an arbitrary axis x in the plane of the PCB, if one looks from the end of axis z (FIG. 10B). In FIG. 10B z-axis is directed from a mount towards an excitation circuit, antenna radiation pattern is maximal in the direction of the axis and minimal in the opposite direction. The starting point M1 has radius $r_1$ and angle $\varphi_1$, the end point M2 has radius $r_2$ and angle $\varphi_2$. The orientation of the conductors is such that $r_2 > r_1$ and at this $\varphi_2 > \varphi_1$. This orientation provides that the field created by currents of parasitic elements is subtracted from the field formed by currents of spiral conducting elements, thereby reducing the DU($\theta$) ratio near angle $\theta$=90°. The length of each conductor 1010 L=0.02$\lambda$, −0.3$\lambda$, where $\lambda$ is the length of the wavelength for the smallest frequency of the operation band, the number of parasitic conductors is 3-20.

Another embodiment of the invention has a PCB-board 1011 with conductors of parasitic elements 1010 that can be located over the excitation circuit 805 at a certain height h5 (FIG. 10C), for example, using a dielectric stand (not shown in the figure). The height is within 0.05$\lambda$-0.2$\lambda$.

As a variant, parasitic elements can be arranged onto several PCB boards spaced in height at a distance h7 (FIG. 10D).

FIG. 11A shows experimental graphs AP F($\theta$) and FIG. 11B shows a ratio DU($\theta$) for a structure shown in FIG. 10C. Design parameters: spiral conductors have four sections, section heights are as follows: h1=41 mm, h2=220 mm, h3=74 mm, h4=3 mm, the corresponding winding angles are $\gamma_1$=18°, $\gamma_2$=45°, $\gamma_3$=50°, $\gamma_4$=13°. The first three sections are left-handed helixes, and the fourth section—a right-handed helix. Inductances 808 have nominal value 9 nH. Each of impedance elements 911$n$ is a resistor of 420 Ohm and inductance 11 nH connected in series, with a gap h6=2 mm. The values of the resistance and the inductance are determined by the requirement of adjusting antenna to required frequency band and by the goal of decreasing the negative influence of the wave reflected from the ends of spiral conductors of bottom section. Parasitic conductors are at the height of h5=36 mm, the length of each parasitic conductor 1010 L=19 mm, the difference of angles $\varphi_2-\varphi_1$=5° (FIG. 10B), the number of parasitic conductors is 12. It can be seen that such a design provides a ratio DU($\theta$)<−20 dB within a range of elevation angles $\theta$=15-90°, and DU($\theta$=90) of about −30 dB. These characteristics are ensured both in low-frequency (1175 MHz, 1230 MHz) and in high-frequency (1575 MHz) bands. $\theta$=90° corresponds to a positive direction of z-axis (FIG. 10C).

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A Global Navigation Satellite System (GNSS) antenna for receiving circularly polarized GNSS signals, the antenna comprising:
   a dielectric cylinder oriented along a vertical axis, and fixed on a base;
   four spiral conductors wrapped around the cylinder that receive the circularly polarized GNSS signals;
   the four spiral conductors divided into an upper longitudinal section and a lower longitudinal section, wherein the lower longitudinal section is closer to the base than the upper longitudinal section;

each spiral conductor of the upper longitudinal section being connected to a corresponding spiral conductor of the lower longitudinal section through a lumped inductor, wherein the spiral conductors in each section have a constant winding angle around the cylinder, wherein the winding angle of all of the spiral conductors in the same longitudinal section is the same, and wherein the winding angle of the upper longitudinal section is lower than the winding angle of the lower longitudinal section; and an excitation circuit connected to the spiral conductors of the upper longitudinal section.

2. A Global Navigation Satellite System (GNSS) antenna for receiving circularly polarized GNSS signals, the antenna comprising:

a dielectric cylinder oriented along a vertical axis, four spiral conductors wrapped around the cylinder that receive the circularly polarized GNSS signals;

the four spiral conductors divided into an upper longitudinal section and a lower longitudinal section;

each spiral conductor of the upper longitudinal section being connected to a corresponding spiral conductor of the lower longitudinal section through a lumped inductor, wherein the spiral conductors in each section have a constant winding angle around the cylinder, wherein the winding angle of all of the spiral conductors in the same longitudinal section is the same, and wherein the winding angle of the upper longitudinal section is lower than the winding angle of the lower longitudinal section;

an excitation circuit connected to the spiral conductors of the upper longitudinal section; and an additional longitudinal section below the lower longitudinal section, wherein the additional longitudinal section includes conducting elements wound in an opposite direction relative to the lower longitudinal section.

3. The antenna of claim 2, further comprising impedances connecting the additional longitudinal section to a base of the antenna.

4. The antenna of claim 2, wherein the impedances are resistive.

5. The antenna of claim 2, wherein the impedances are resistive and series or parallel inductive.

6. The antenna of claim 2, wherein a winding angle of the additional longitudinal section is 5°-25°.

7. The antenna of claim 2, further comprising an extra additional longitudinal section between the additional longitudinal section and the lower section.

8. The antenna of claim 1, wherein the winding angle of the upper longitudinal section is 10°-30°.

9. The antenna of claim 1, wherein the winding angle of the lower longitudinal section is 35°-70°.

10. The antenna of claim 1, further comprising a first set of additional parasitic conductive elements in a first plane perpendicular to the vertical axis and rotationally symmetric around the vertical axis, wherein the first plane is located approximately where the inductors are located.

11. The antenna of claim 1, further comprising a first set of additional parasitic conductive elements located around the spiral conductive elements.

12. The antenna of claim 1, further comprising a first set of additional parasitic conductive elements located above the spiral conductive elements.

13. The antenna of claim 12, wherein the additional parasitic conductive elements are straight.

14. The antenna of claim 12, wherein the additional parasitic conductive elements are bent.

15. The antenna of claim 12, further comprising second set of additional parasitic conductive elements in a second plane perpendicular to the vertical axis and rotationally symmetric around the vertical axis, wherein the second plane is above the upper longitudinal section.

16. A Global Navigation Satellite System (GNSS) antenna comprising:

a dielectric cylinder oriented along a vertical axis;

four spiral conductors wrapped around the cylinder;

the four spiral conductors divided into an upper longitudinal section and a lower longitudinal section, wherein the spiral conductors in each section have a constant winding angle around the cylinder, wherein the winding angle of all of the spiral conductors in the same longitudinal section is the same, and wherein the winding angle of the upper longitudinal section is lower than the winding angle of the lower longitudinal section;

an additional longitudinal section below the lower longitudinal section, wherein the additional longitudinal section includes conductors wound in an opposite direction relative to the lower longitudinal section; and an excitation circuit connected to the conductors of the upper longitudinal section.

17. The antenna of claim 16, further comprising a set of parasitic conductive elements that are rotationally symmetric around the vertical axis.

* * * * *